United States Patent
Perepa et al.

(10) Patent No.: US 7,539,728 B2
(45) Date of Patent: May 26, 2009

(54) TIME SENSITIVE ELECTRONIC MAIL

(75) Inventors: Bhargav V. Perepa, Austin, TX (US); Sujatha Perepa, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 10/637,026

(22) Filed: Aug. 7, 2003

(65) Prior Publication Data

US 2005/0033845 A1 Feb. 10, 2005

(51) Int. Cl.
G06F 15/16 (2006.01)
G06F 15/173 (2006.01)
G06F 15/177 (2006.01)

(52) U.S. Cl. .................. 709/206; 709/217; 705/14; 705/27

(58) Field of Classification Search ......... 709/200–208, 709/217–228; 705/14, 27
See application file for complete search history.

(56) References Cited

U.S. PATENT DOCUMENTS

| | | | |
|---|---|---|---|
| 5,210,869 A | 5/1993 | Williams | 395/600 |
| 5,682,477 A | 10/1997 | Wakamiya et al. | 395/200.12 |
| 6,047,322 A | 4/2000 | Vaid et al. | 709/224 |
| 6,119,235 A | 9/2000 | Vaid et al. | 713/201 |
| 6,442,593 B1 * | 8/2002 | Wang et al. | 709/206 |
| 6,725,256 B1 * | 4/2004 | Albal et al. | 709/206 |
| 6,820,113 B2 * | 11/2004 | Wang et al. | 709/206 |
| 7,284,034 B2 * | 10/2007 | Matsa et al. | 709/206 |
| 2002/0026356 A1 | 2/2002 | Bergh et al. | |
| 2002/0065748 A1 * | 5/2002 | Taniguchi et al. | 705/27 |
| 2002/0087704 A1 * | 7/2002 | Chesnais et al. | 709/228 |
| 2002/0178231 A1 * | 11/2002 | Matsa et al. | 709/206 |
| 2003/0023521 A1 | 1/2003 | Banjerjee et al. | |
| 2003/0222765 A1 * | 12/2003 | Curbow et al. | 340/309.7 |
| 2003/0229668 A1 * | 12/2003 | Malik | 709/206 |
| 2003/0229673 A1 * | 12/2003 | Malik | 709/207 |
| 2004/0249709 A1 * | 12/2004 | Donovan et al. | 705/14 |
| 2006/0112165 A9 * | 5/2006 | Tomkow et al. | 709/206 |
| 2007/0016647 A1 * | 1/2007 | Gupta et al. | 709/206 |

FOREIGN PATENT DOCUMENTS

JP 06-252942 9/1994

(Continued)

OTHER PUBLICATIONS

Inspect Abstract No. B82060613, C82043960; Entitled "Message-Transport Software Does the Job" (Electronic Design, vol. 30, No. 14, p. 25-29, Duke et al. Jul. 1982).

Primary Examiner—Haresh N Patel
(74) Attorney, Agent, or Firm—H. Artoush Ohanian; Justin Dillon; Biggers & Ohanian LLP

(57) ABSTRACT

Delivering time sensitive email including creating an email message for time-sensitive delivery to a multiplicity of addressees' mailboxes on email servers, including inserting in the email message a data element identifying the message as a message for time-sensitive delivery; assigning delivery time constraints to the message; delivering the message, in accordance with the time constraints and for temporary storage outside the mailboxes, to email servers having addressees' mailboxes; and instructing the servers to place the message in all addressees' mailboxes at approximately the same time.

16 Claims, 9 Drawing Sheets

FOREIGN PATENT DOCUMENTS

| | | |
|---|---|---|
| JP | 06-303256 | 10/1994 |
| JP | 09-081650 | 3/1997 |
| JP | 10-049453 | 2/1998 |
| JP | 11-261549 | 9/1999 |
| JP | 2000--172580 | 6/2000 |
| JP | 2001105732 | 4/2001 |
| JP | 2001-092735 | 6/2001 |

* cited by examiner

TIME SENSITIVE ELECTRONIC MAIL

BACKGROUND OF THE INVENTION

1. Field of the Invention

The field of the invention is data processing, or, more specifically, methods, systems, and products for time sensitive email.

2. Description of Related Art

Email systems are capable of administering the transmission of email messages from a sender to many addressees. Prior art email systems, however, typically provide little or no control over the actual delivery time of email messages. In such systems, an email message having many addressees may arrive in the addressees' mailboxes over a very wide range of time, including, in some cases, not arriving at all. There are circumstances, however, when it would be advantageous to have a way of transmitting an email message so that it is delivered or made available to addressees at approximately the same time. Examples of circumstances when approximately simultaneous, time-sensitive delivery would be an advantage include organization-wide corporate policy announcements, organization-wide announcements of important corporate changes such as acquisitions, organization-wide announcements of financial results for a quarter, short or timed sales promotions for on-line auction companies, short or timed announcements of benefit plan enrollments periods, and so on. For these reasons, there is an ongoing need for improvements in email systems.

SUMMARY OF THE INVENTION

Methods, systems, and computer program products for delivering time sensitive email are disclosed as operating generally by creating an email message for time-sensitive delivery to a multiplicity of addressees' mailboxes on email servers, assigning delivery time constraints to the message, and delivering the message to addressees' mailboxes in two phases. In a first phase, the messages are delivered to email servers having addressees' mailboxes ('destination servers') for temporary storage outside the mailboxes. In a second phase, the messages are moved approximately simultaneously from temporary storage into the mailboxes. Each destination server may serve one or more addressees' mailboxes.

Typical embodiments of the invention provide users the ability, in creating an email message, to indicate an action to be taken when time constraints cannot be met. Similarly, creating an email message often includes indicating an action to be taken when one or more servers, having stored the message outside mailboxes, fail to receive an instruction to place the message in mailboxes.

Email messages often comprise a hierarchical addressee list comprising aliases and methods of delivering time sensitive email often include expanding the hierarchical addressee list into a flat addressee list comprising no aliases. Expanding a hierarchical addressee list may be carried out by expanding one or more aliases that are defined on one or more email hosts other than an email client where the email message is created. Methods of delivering time sensitive email often include verifying the email addresses in an addressee list.

Typical embodiments include determining whether a time sensitive email message can be delivered in accordance with time constraints. Determining whether a message can be delivered in accordance with time constraints may be carried out by use of message delivery metrics. In many embodiments, delivering time sensitive email includes providing, for review by users, message delivery information that describes the delivery of an email message.

Many methods for delivery time sensitive email according to embodiments of the present invention include receiving in an email server an email message for time-sensitive delivery to a multiplicity of addressees, wherein the email server is disposed within a delivery route for the email message, and the email message has a sender. Such embodiments also typically include transmitting to the sender of the email message an email protocol message bearing message delivery information and, if the email server is not the last email server in the delivery route, relaying the email message to a next server on the delivery route. When an email server receiving an email message is the last server on the delivery route, methods of delivery time sensitive email according to embodiments of the present invention typically also include storing the message temporarily outside the addressee's mailbox; receiving from the sender an instruction to move the message to the addressee's mailbox; and, responsive to the instruction, moving the message to the addressee's mailbox. Typical embodiments also support moving a message to a mailbox or discarding it according to time constraints, user preferences, and cancellation instructions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
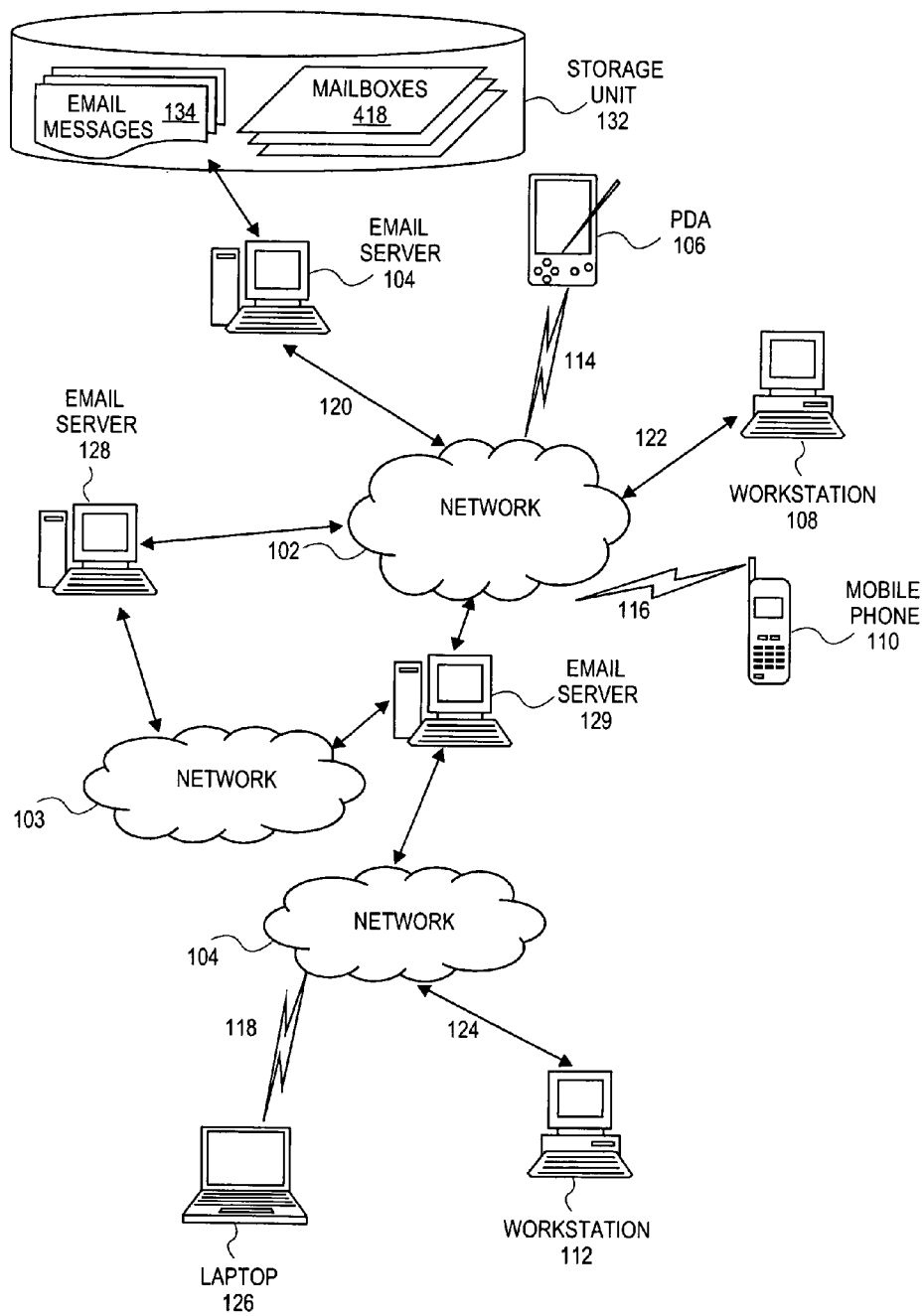
FIG. 1 depicts an architecture for an email system in which various embodiments of the present invention may be implemented.

The present invention is described to a large extent in this specification in terms of methods for time sensitive email. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Time-Sensitive Email

Methods, systems, and computer program products for delivering time sensitive email according to exemplary embodiments of the present invention operate generally by creating an email message for time-sensitive delivery to a multiplicity of addressees' mailboxes on email servers, assigning delivery time constraints to the message, and delivering the message to the mailboxes in two phases. In a first phase, the messages are delivered to email servers having addressees' mailboxes ('destination server') for temporary storage outside the mailboxes. In a second phase, the messages are moved approximately simultaneously from temporary storage into the mailboxes. Each destination server may serve one or more addressees' mailboxes.

The term 'server' in this specification refers to a computer or other automated computing machinery on a network that manages resources, including email messages, and requests for access to or administration of such resources. An 'email server' is a server that communicates with email clients and other email servers to manage and communicate email messages. Similarly, an 'email client' is any computer, including its application software, that requests email-related services from another computer (i.e., an email server). Any given computer or combination of computer hardware and computer software may function at one time or another as both a client and a server. The use of the terms 'client' and 'sever' in this disclosure refers primarily to the role being performed by a computer or program for a particular application or data communications connection, rather than to the computer or program's capabilities in general.

The time sensitive email messages according to embodiments of the present invention are created with time constraints. The time constraints include an earliest time by which the message is to be delivered to all destination servers for all addressees for temporary storage outside mailboxes, and there may be many addressees and therefore many destination servers. Another way of describing the first time constraint is that it specifies the earliest time by which the message is to be available on all destination servers in temporary storage and available for approximately simultaneous move to addressees' mailboxes.

The time constraints include also a latest time by which the message is to be moved from temporary storage to addressees' mailboxes, or, depending on user preferences, discarded. The messages are typically moved from temporary storage to mailboxes in response to an email protocol message instructing the destination servers to move the message to the mailboxes. Such as email protocol message in this disclosure is often called a 'phase-2 message,' referring to the second phase of delivery described above. In some cases, the phase-2 message may not be received before the second time constraint, the latest time by which the message is to be moved from temporary storage to addressees' mailboxes. If the phase-2 message is not received, the message is discarded, or, user preferences permitting, moved to mailboxes promptly upon timeout or expiration of the period defined by the second time constraint.

The phase-2 message itself is typically short, typically bearing little or no message body data and only a small quantity of meta-data identifying it as a phase-2 message for a particular time sensitive email message. Because the phase-2 message is a small message, it can reliably be transmitted from a sender to all pertinent destination servers in a short period of time, so that all the destination servers then move the message to all addressees' mailboxes within a short period of time, and this is what is meant by 'time-sensitive delivery' in this disclosure. That is, 'time-sensitive delivery' is delivery into a multiplicity of addresses' mailboxes in a relatively short period of time, the actual length of the period depending on the usual determinants of computer speed and electronic communications speed.

"Meta-data," as the term is used in this disclosure, means data describing a time sensitive email message. Meta-data is typically set forth in the time sensitive email message itself. Meta-data includes a message type code identifying a message as a time sensitive email message, time constraints, action directives in the event that a phase-2 message is not received before a timeout, other delivery preferences, and so on. Email messages generally are composed of a 'header' and a 'body.' The header includes various fields such as a sender's email identification, addressees' email identifications, route tracing data, and so on. The body typically is text or other data comprising the message content. It is useful to distinguish meta-data from the body and the other usual header fields.

Some email protocols, including for example the Simple Mail Transport Protocol ("SMTP"), for example, support optional additional header fields. In the example of SMTP, so-called 'optional fields' are defined in the standard, including a required syntax: a field name (that must not duplicate a standard field name) followed by a colon followed by unstructured text.

From: John Doe <jdoe@machine.example>
To: Mary Smith <mary@example.net>
Subject: Saying Hello
Date: Fri, 21 Nov. 2003 09:55:06
Message-ID: <1234@local.machine.example>
Message-Type: Time Sensitive
Time-Constraint-Earliest: Sat, 15 Dec. 2003 08:00:00
Time-Constraint-Latest: Sat, 15 Dec. 2003 09:00:00
Mary,
This is a message just to say 'hello.' I enjoyed meeting you at the conference last week. Let's stay in touch.
Regards,
John In this example, the first five fields, 'From:,' 'To:,' 'Subject:,' 'Date:,' and 'Message-ID' are standard SMTP fields. The last three fields, Message-Type, Time-Constraint-Earliest, and Time-Constraint-Latest are new fields, meta-data implemented to support embodiments according to the present invention. The Message-Type field identifies the message as a time sensitive email message. The Time-Constraint-Earliest field identifies a first time constraint, the earliest time the message is to be available on destination severs. The field Time-Constraint-Latest identifies a second time constraint, the latest time for moving a message to addressees' mailboxes.

Another way of including meta-data in time sensitive email messages is to insert in the message body itself. SMTP, for example, uses this method to insert time stamps on messages when they are relayed through email servers and when they are received in destination servers. In the following email message, for example:

From: John Doe <jdoe@machine.example>
To: Mary Smith <mary@example.net>
Subject: Saying Hello
Date: Fri, 21 Nov. 2003 09:55:06
Message-ID: <1234@local.machine.example>
<Message-Type: Time Sensitive>
<Time-Constraint-Earliest: Sat, 15 Dec. 2003 08:00:00>
<Time-Constraint-Latest: Sat, 15 Dec. 2003 09:00:00>
Mary,
This is a message just to say 'hello.' I enjoyed meeting you at the conference last week. Let's stay in touch.
Regards,
John, the meta-data element identifying the email message as time sensitive and the meta-data elements for the time constraints are delimited with angle-brackets <> and inserted at the beginning of the body of the message.

Many email systems support message formatting in HTML. In this example:

```
<HTML>
    <HEAD>
        <META name="Message Type"
           content="Time Sensitive">
        <META name="Time-Constraint-Earliest" content=" Sat, 15
           Dec 2003 08:00:00">
        <META name="Time-Constraint-Latest" content=" Sat, 15
           Dec 2003 09:00:00">
    </HEAD>
    <BODY>
        Mary,
        This is a message just to say 'hello.' I enjoyed meeting you at
        the conference last week. Let's stay in touch.
        Regards,
        John
    </BODY>
</HTML>
``` the meta-data element identifying the email message as time sensitive and the meta-data elements for the time constraints are set forth in HTML <meta> tags. In addition to optional email protocol header fields, insertion in email body segments, and insertion in HTML <meta> tags, other methods of including pertinent meta-data in time sensitive email message will occur to those of skill in the art, and all such methods are well within the scope of the present invention.

Readers will notice that no 'phase-1' message is described. Meta-data in a time sensitive email message identifies each time sensitive email message as a time sensitive email message. Destination servers according to embodiments of the present invention are programmed to check incoming message meta-data to identify time sensitive email messages and place them in temporary storage until receipt of a phase-2 message, a timeout, or a cancellation message. A time sensitive email message bearing meta-data identifying it as a time sensitive email message therefore itself triggers the first phase of delivery, effectively itself serving as a phase-1 message. There is typically no need, therefore, for a separate phase-1 message as such.

Exemplary methods, systems, and products for time sensitive email are further explained with reference to the accompanying drawings, beginning with FIG. 1. FIG. 1 depicts an architecture for an email system in which various embodiments of the present invention may be implemented. The system of FIG. 1 includes a number of computers and other automated computing machinery connected for data communications in networks. The computers and automated computing machinery depicted are all capable of functioning email hosts, that is, email clients or email servers, according to embodiments of the present invention. The term 'automated computing machinery' is used to refer to devices such as mobile telephones and personal digital assistants ("PDAs") which are automated with email client or email server software according to embodiments of the present invention, but which may not be the kind of device that is ordinarily referred to as a 'computer.' The term 'computer,' as used in this specification, includes all kinds of automated computing machinery.

The system of FIG. 1 includes networks 102, 103, and 104. Networks in such systems may comprise LANs, WANs, intranets, internets, the Internet, webs, and the World Wide Web itself. Such networks comprise media that may be used to provide couplings for data communications between various computers and other automated computing machinery connected together within a distributed data processing system such as the email system of FIG. 1. Such networks may include permanent couplings, such as wire or fiber optic cables, or temporary couplings made through wireline telephone or wireless communications.

In the example of FIG. 1, PDA 106, computer workstation 108, mobile telephone 110, computer workstation 112, and laptop computer 126 are all examples of email clients, that is, automated devices that include email client software applications capable of sending time sensitive email messages according to embodiments of the present invention. In this example, PDA 106, workstation 108, and mobile phone 110 are connected to network 102. Workstation 108 connects to network 102 through a wireline connection 122. Network-enabled mobile phone 110 connects to network 102 through wireless link 116, and PDA 106 connects to network 102 through wireless link 114. Workstation 112 connects to network 104 through wireline connection 124, and laptop 126 connects to network 104 through wireless link 118.

Servers 104, 128, and 129 are email servers, that is, computers that include email server software applications capable of receiving time sensitive email messages, relaying them, storing them temporarily, and moving them to mailboxes, all according to embodiments of the present invention. In the example of FIG. 1, email server 104 connects to network 102. Email server 128 connects to networks 102 and 103, and email server 128 connects to networks 102, 103, and 104.

In the example of FIG. 1, storage unit 132 is connected to network 102 through server 104. Storage unit 132 is implemented as any kind of computer memory as will occur to those of skill in the art, hard drive, optical drive, random access memory, and so on. Storage unit 132 represents temporary storage space for email messages 134 as well as storage space for mailboxes 418.

For further explanation, consider an example of hop counting with respect to the email system of FIG. 1. In particular this example explains that hops are counted only between email servers, not between email servers and email clients. In this example email server 129 has a mailbox for an email client on workstation 112, and a user originates an email message from the email client on workstation 112 addressed to an addressee, an email client on workstation 108 that has a mailbox on email server 104. When the user finishes composing the message and instructs the email client on workstation 112 to send the message, the email client on workstation 112 transmits the email message, encapsulated in an email protocol message, to its mailbox on email server 129. The email protocol may be, for example, the Simple Mail Transport Protocol ("SMTP") or the Post Office Protocol ("POP"). The transmission of the email message from workstation 112 to email server 129 does not count as a hop.

Email server 129 then routes the email message from email server 129 to email server 104 through one of at least two exemplary routes. Email server 129 may transmit the email message directly to email server 104, for a hop count of '1.' Alternatively, email server 129 may relay the message to email server 128 which in turn relays the message to email server 104, for a hop count of '2.' This example shows delivery routes having 1 hop and 2 hops, but in actual embodiments according to the present invention there is no limitation on the number of hops. Delivery routes may be implemented with any number of hops, although the hop count for a route may be of interest as an indication of the quality of message delivery. Eventually a user of workstation 108 will logon to an email client on workstation 108 and download the email message from the mailbox on email server 104. The download of the email message from email server 104 to an email client on workstation 108 does not count as a hop.

The example of email servers and email clients illustrated in FIG. 1 are for explanation, not for limitation. Email systems may include additional servers, clients, routers, and other devices not shown in FIG. 1 as will occur to those of skill in the art. Networks in such email systems may support many data communications protocols, SMNT, POP, the Hypertext Transport Protocol ("HTTP"), the Wireless Access Protocol ("WAP"), the Handheld Device Transport Protocol ("HDTP"), the Transport Control Protocol/Internet Protocol Suite ("TCP/IP"), and others as will occur to those of skill in the art. FIG. 1 is presented as an example of a heterogeneous email environment in which various embodiments of the present invention may be implemented, not as an architectural limitation of the present invention.

Figure 2:
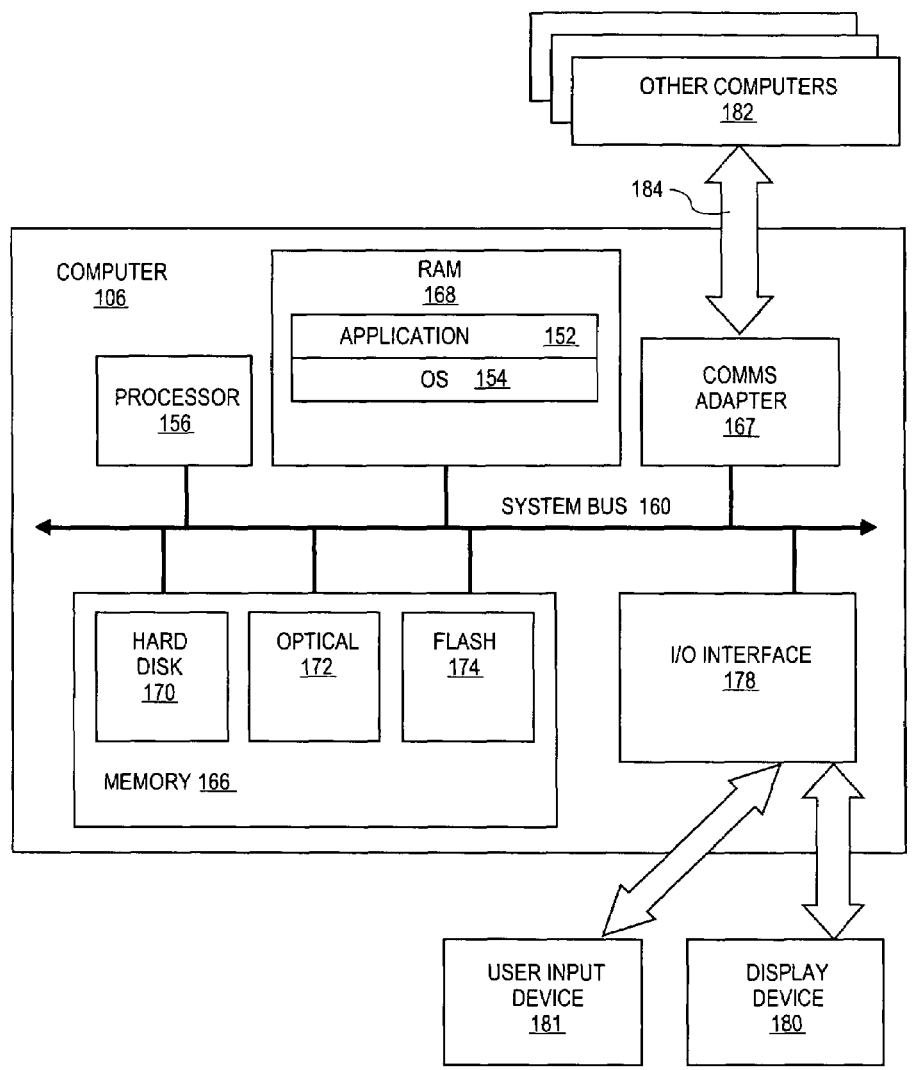
FIG. 2 sets forth a block diagram of an exemplary computer useful as an email client or email server according to embodiments of the present invention.

FIG. 2 sets forth a block diagram of automated computing machinery comprising a computer 106, such as an email client or email server useful in email systems according to embodiments of the present invention. The computer 106 of FIG. 2 includes at least one computer processor 156 or 'CPU' as well as random access memory 168 ("RAM"). Stored in RAM 168 is an application program 152. When a computer like computer 106 is implemented as an email client, application 152 includes email client application software. When a computer like computer 106 is implemented as an email server, application 152 includes email server application software. Examples of prior art email application software include, for example, Microsoft Microsoft's Outlook™, Qualcomm's Eudora™, or Lotus Notes™. Such prior art email application software may be improved by use of plug-ins or modification at the source code level in accordance with embodiments of the present invention, or, alternatively, completely new email applications may be developed from scratch to implement embodiments of the present invention.

Also stored in RAM 168 is an operating system 154. Operating systems useful in email computers or 'email hosts' according to embodiments of the present invention include Unix, Linux, Microsoft NT™, and others as will occur to those of skill in the art.

The example computer 106 of FIG. 2 includes computer memory 166 coupled through a system bus 160 to the processor 156 and to other components of the computer. Computer memory 166 may be implemented as a hard disk drive 170, optical disk drive 172, electrically erasable programmable read-only memory space (so-called 'EEPROM' or 'Flash' memory) 174, RAM drives (not shown), or as any other kind of computer memory as will occur to those of skill in the art.

The example computer 106 of FIG. 2 includes communications adapter 167 that implements connections for data communications 184 to other computers 182, email servers and email clients. Communications adapters implement the hardware level of data communications connections through which client computers and servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 2 includes one or more input/output interface adapters 178. Input/output interface adapters in computers implement user-oriented input/output through, for example, software drivers and computer hardware for controlling output to display devices 180 such as computer display screens, as well as user input from user input devices 181 such as keyboards and mice.

Figure 3:
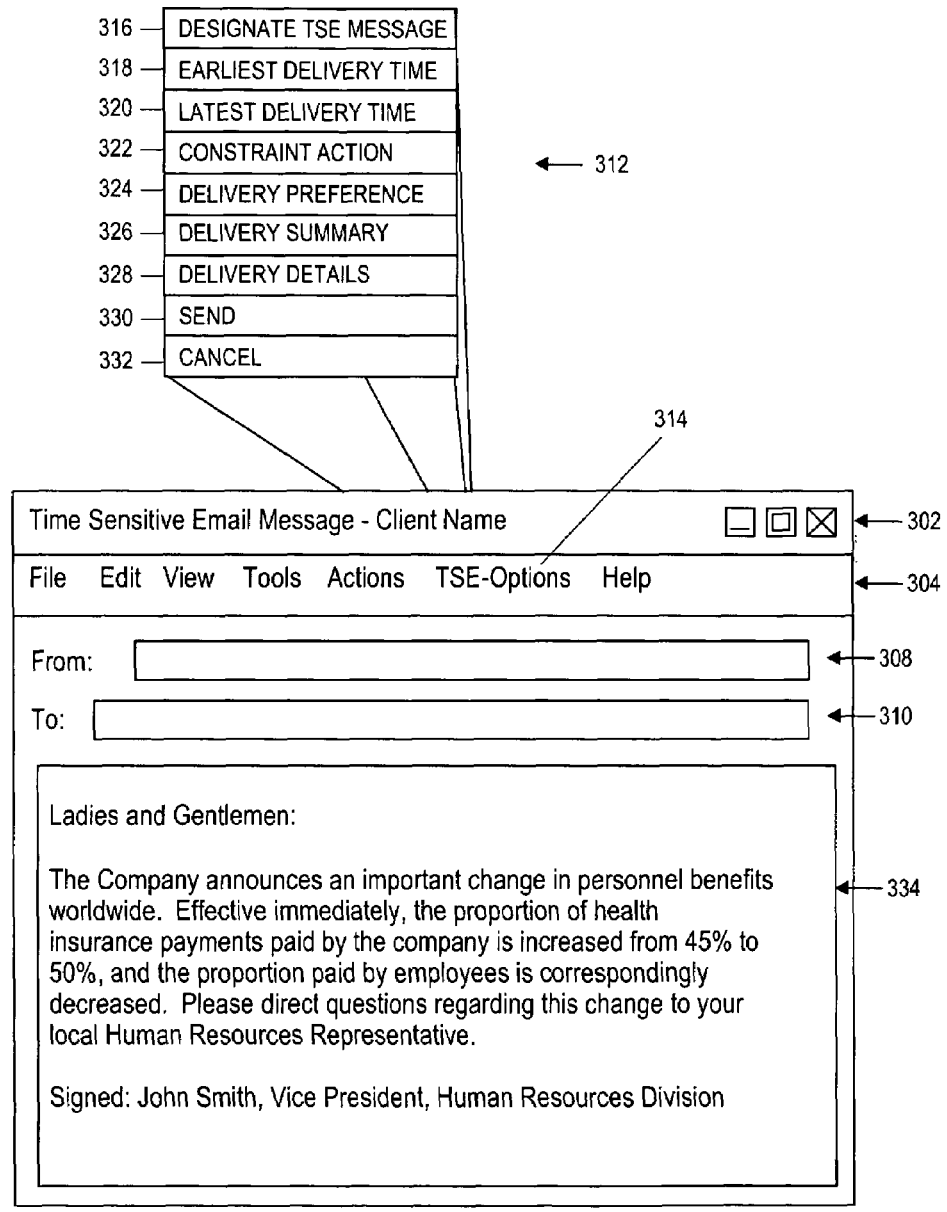
FIG. 3 sets forth a line drawing of a data entry screen on an email client improved according to embodiments of the present invention.

Exemplary embodiments of the present invention are further explained with reference to FIG. 3. FIG. 3 sets forth a line drawing of a data entry screen on an email client improved according to embodiments of the present invention. The data entry screen of FIG. 3 includes a title line 302 that displays the fact that the document under edit is a time sensitive email document and the name of the email client ("Client Name"). In actual embodiments, the 'Client Name' is often the actual name of an email client application such as Lotus Notes™, Microsoft Outlook™, or Qualcomm Eudora™.

The data entry screen of FIG. 3 includes a horizontal menu 304 containing the usual menu items such as 'File,' 'Edit,' 'View,' and so on. In addition to the usual kind of menu items for such an email screen, the horizontal menu 304 contains a new item labeled 'TSE-Options,' referring to time sensitive email options. Invoking the TSE-Options menu item displays the pull-down menu 312 which makes available several functions supporting time sensitive email according to embodiments of the present invention.

Figure 4:
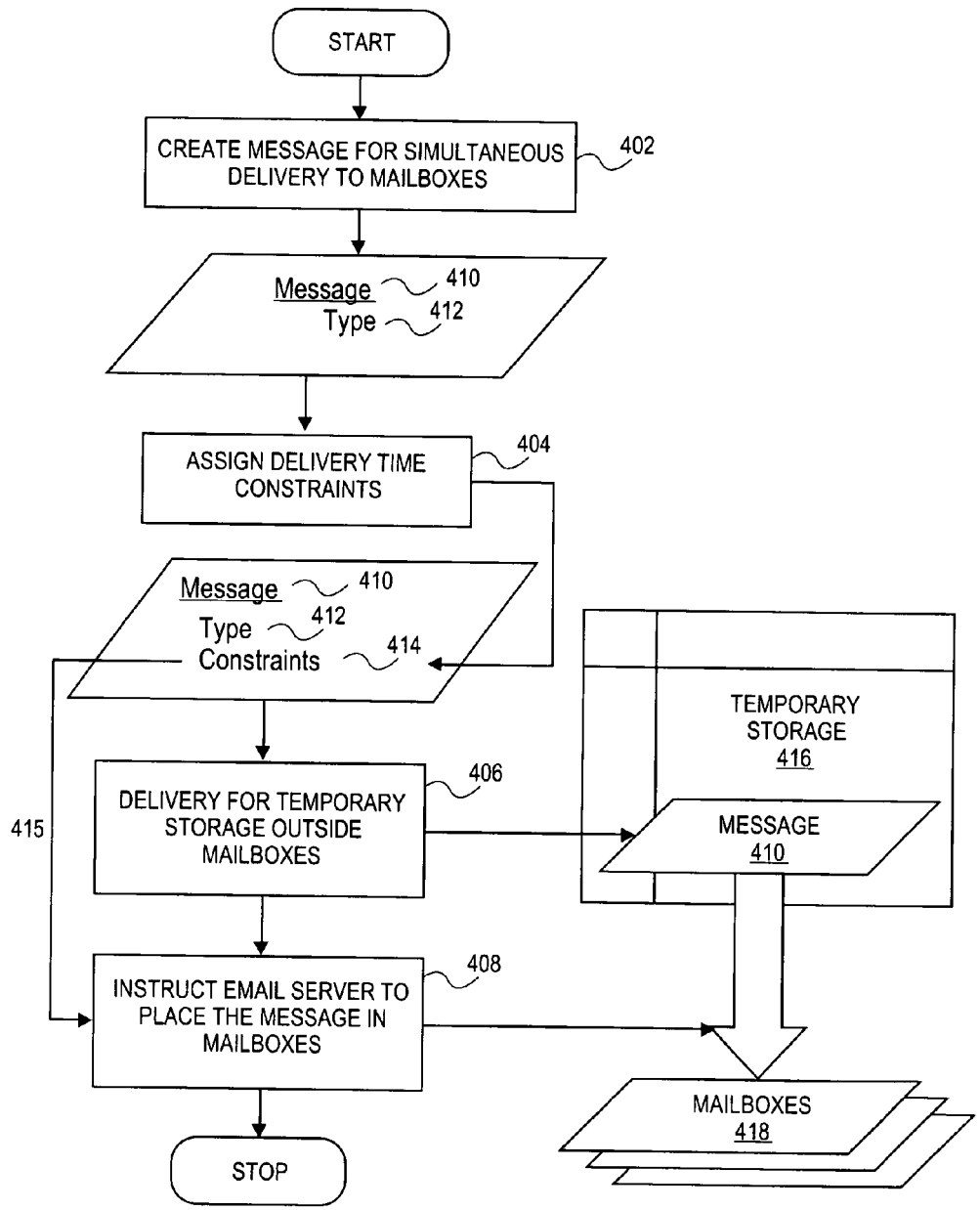
FIG. 4 sets forth a flow chart depicting an exemplary method for delivering time sensitive email.

FIG. 4 sets forth a flow chart depicting an exemplary method for delivering time sensitive email that includes creating 402 an email message 410 for time-sensitive delivery to a multiplicity of addressees' mailboxes on email servers. In the method of FIG. 4, creating the email message includes inserting in the email message a data element 412 identifying the message as a message for time-sensitive delivery. That is, the data element 412 is implemented as a field of meta-data identifying the email message 410 as a time sensitive email message as described above. The data element 412 may be inserted, for example, by invoking pull-down menu item 316 on FIG. 3, 'Designate TSE Message,' in response to which the email client is programmed to insert in meta-data in the message a field designating the email message as a time sensitive email message. This functionality represents an ability to encapsulate function specific protocol information in a message header or message meta-data.

The method of FIG. 4 includes assigning 404 delivery time constraints 414 to the message. Assigning delivery time constraints is carried out by data entry in an email client improved according to embodiments of the present invention. The email client illustrated in FIG. 3, for example, is programmed to function in response to invoking pull-down menu items 318 and 320 to prompt a user to enter through a data entry form (not shown) delivery time constraints including the earliest time for phase-1 staging of the message in temporary storage on destination servers and the latest time for moving the message to addressees' mailboxes.

The method of FIG. 4 includes delivering 406 the message 410 in accordance with the time constraints and for temporary storage outside the mailboxes, to email servers having addressees' mailboxes. Email servers having addressees' mailboxes are destination servers, that is, the last servers in delivery routes for the message. Destination servers according to embodiments of the present invention are programmed so that when a message arrives bearing a meta-data field identifying it as a time sensitive message for time-sensitive delivery, rather than placing such a message in addressees' mailboxes straightaway, the server instead places the message in temporary storage outside the mailboxes.

The method of FIG. 4 includes instructing 410 the servers to place the message 410 in all addressees' mailboxes 418 at approximately the same time. Instructing the servers to place the message in addressees' mailboxes is typically carried out by sending a phase-2 message to the destination servers as described earlier. Here is an example of a phase-2 message:

From: John Doe <jdoe@machine.example>
    To: Mary Smith <mary@example.net>
    Date: Fri, 21 Nov. 2003 09:55:06
    Message-ID: <5678@local.machine.example>
    Time-Sensitive-Message-ID: <1234@local.machine.example>
    Message-Type: Phase-2

This is an example of a phase-2 message that is very short, containing no message body at all, just header data. The first four fields, From, To, Date, and Message-ID are standard email protocol fields, in this particular example, from SMTP. The last two fields are new fields according to the present invention. The Message-Type field identifies the message as a phase-2 message, an instruction to email servers according to embodiments of the present invention to move a time sensitive email message from temporary storage to addressees' mailboxes. The Time-Sensitive-Message-ID field identifies the time sensitive email message (already residing in temporary storage on a destination server) for which the phase-2 message represents an instruction to move to a mailbox. It is useful to distinguish the Message-ID field and the Time-Sensitive-Message-ID field. The Message-ID field identifies the phase-2 message itself, a normal usage of the underlying email protocol. The Time-Sensitive-Message-ID identifies a related time sensitive email message for use by email servers improved to support embodiments according to the present invention. The Time-Sensitive-Message-ID is transparent to any underlying standard email protocol.

In the exemplary method of FIG. 4, creating 402 an email message may also include indicating an action to be taken when the time constraints cannot be met. Indicating an action to be taken when time constraints cannot be met may be carried out through a data entry prompt in response to invocation of a pull-down menu item such as the one labeled "Constraint Action" at reference 322 on FIG. 3. An email client programmed to prompt for an action to be taken when time constraints cannot be met is programmed also to encode the action to be taken when time constraints cannot be met in meta-data in a time sensitive email message. Such an encoding may be done, for example, as follows:

From: John Doe <jdoe@machine.example>
    To: Mary Smith <mary@example.net>
    Subject: Saying Hello
    Date: Fri, 21 Nov. 2003 09:55:06
    Message-ID: <1234@local.machine.example>
    Message-Type: Time Sensitive
    Time-Constraint-Earliest: Sat, 15 Dec. 2003 08:00:00
    Time-Constraint-Latest: Sat, 15 Dec. 2003 09:00:00
    Constraint-Action: All-or-Nothing In this example, the field named 'Constraint-Action' records an action to be taken when time constraints cannot be met. In this example, the value of the Constraint-Action field is set to 'All-or-Nothing,' representing an instruction that the message is not to be sent at all if time constraints cannot be met. An email client responsive to this encoding, tests whether time constraints can be met, testing in particular whether the email message can be successfully provided in phase-1 to all destination servers no later than the constraint set forth as 'Time-Constraint-Earliest.' If such a time constraint cannot be met, an email client response to 'All-or-Nothing' as an action to be taken if time constraints cannot be met, advises the user who created the message that the message will not be sent because time constraints cannot be met.

Email clients according to embodiments of the present invention also often support another action to be taken if time constraints cannot be met, that is, a partial delivery within the time constraints. A representation of such an action may be encoded, for example, as 'Partial-Delivery-Acceptable.' When in the process of testing whether a message can be delivered in accordance with its time constraints, an email client determines that some of the messages might not arrive at destination servers before the message's 'Time-Constraint-Earliest' constraint, such an email client, responsive to a Constraint-Action value of 'Partial-Delivery-Acceptable,' sends the message anyway.

In the exemplary method of FIG. 4, creating 402 an email message may also include indicating an action to be taken when one or more servers, having temporarily stored the message outside mailboxes, fail to receive an instruction to place the message in mailboxes. That is, in creating a message, a user may also entered as a preference regarding what a destination server is to do if its phase-2 message never arrives. Alternatives include discarding the message or placing it in mailboxes upon timeout regardless whether the phase-2 message is received. Indicating an action to be taken when servers fail to receive an instruction to place the message in mailboxes may be carried out through a data entry prompt in response to invocation of a pull-down menu item such as the one labeled "Delivery Preference" at reference 324 on FIG. 3. An email client programmed to prompt for an action to be taken when servers fail to receive an instruction to place the message in mailboxes is programmed also to encode the action to be taken when servers fail to receive an instruction to place the message in mailboxes in meta-data in a time sensitive email message. Such an encoding may be done, for example, as follows:

From: John Doe <jdoe@machine.example>
    To: Mary Smith <mary@example.net>
    Subject: Saying Hello
    Date: Fri, 21 Nov. 2003 09:55:06
    Message-ID: <1234@local.machine.example>

Message-Type: Time Sensitive
Time-Constraint-Earliest: Sat, 15 Dec. 2003 08:00:00
Time-Constraint-Latest: Sat, 15 Dec. 2003 09:00:00
Delivery-Preference: Discard In this example, the field named 'Delivery-Preference' records an action to be taken when servers fail to receive an instruction to place the message in mailboxes. In this example, the value of the Delivery-Preference field is set to 'Discard,' representing an instruction that the message is to be discarded if servers fail to receive an instruction to place the message in mailboxes by the time recorded as 'Time-Constraint-Latest.' A failure to receive an instruction to place the message in mailboxes by the time recorded as 'Time-Constraint-Latest' is referred to as a 'timeout.' Servers according to embodiments supporting such a preference are programmed upon timeout to discard a time sensitive email message bearing a delivery preference indicating that the message is to be discarded in the absence of a phase-2 message.

Email clients according to embodiments of the present invention also often support another action to be taken when servers fail to receive an instruction to place the message in mailboxes, that is, delivering the message upon timeout regardless whether an instruction to place the message in mailboxes (a 'phase-2 message') has been received. A representation of such an action may be encoded, for example, as 'Deliver-Anyway.' Servers according to embodiments supporting such a preference are programmed upon timeout to place a message bearing the delivery preference 'Deliver-Anyway' in all addresses' mailboxes on such a server regardless of the fact that no phase-2 message has been received.

Figure 5:
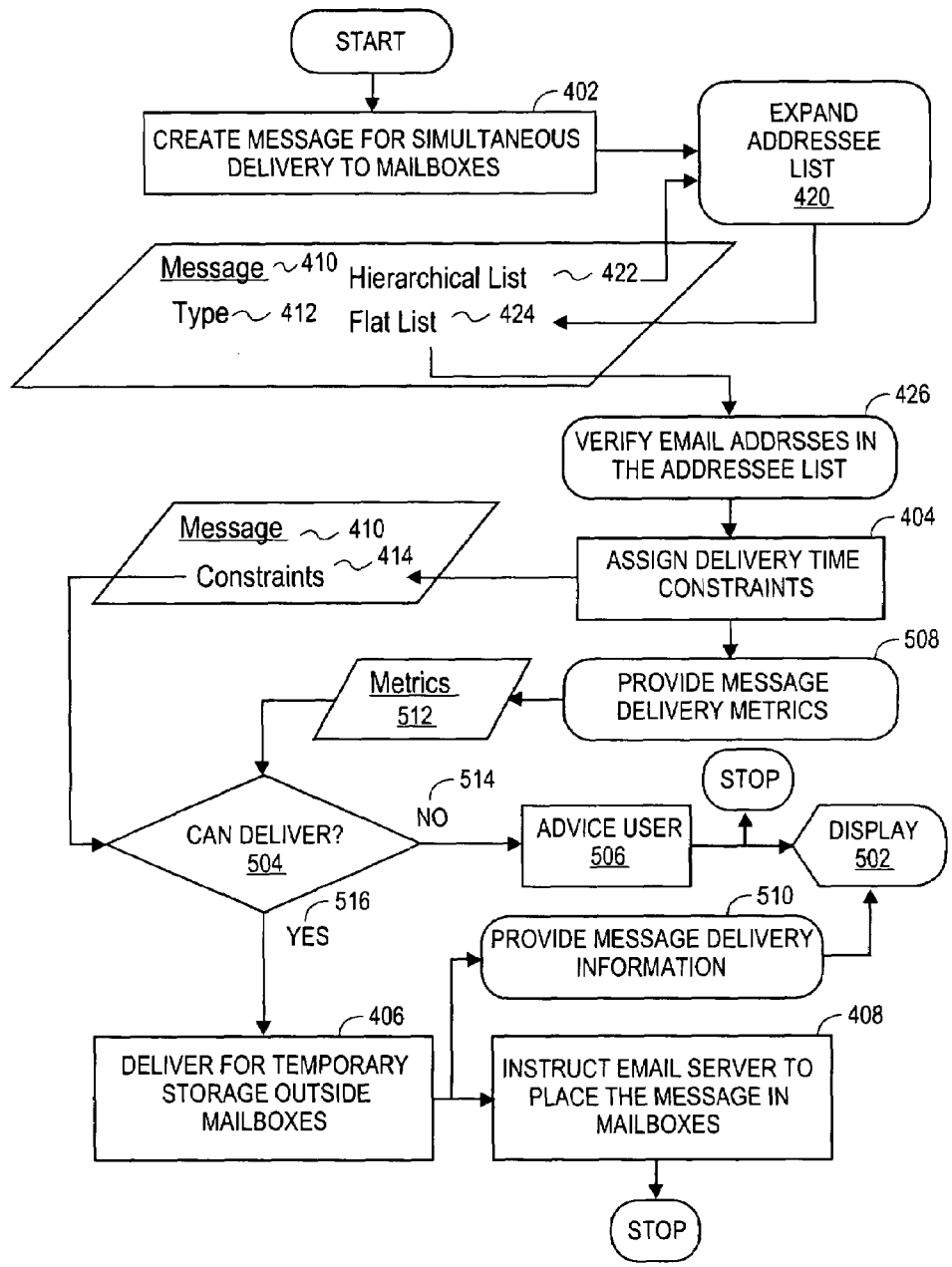
FIG. 5 sets forth a flow chart depicting a further exemplary method for delivering time sensitive email where an email message comprises a hierarchical addressee list comprising aliases.

FIG. 5 sets forth a flow chart depicting a further exemplary method for delivering time sensitive email where the email message 410 comprises a hierarchical addressee list 422 comprising aliases. Aliases are data elements, allowed by email clients to be inserted in addressee lists, representing sublists of addressees' email addresses. On the email data entry screen of FIG. 3, for example, a user may enter in the To: field 310 both addressees' email addresses and also one or more email aliases. For an email client according to embodiments of the present invention, a client that may, for example, validate email addresses and use email addresses to analyze whether delivery time constraints can be met, it is advantageous to have the email addresses to work with as such rather than merely their aliases. The method of FIG. 5 includes expanding 420 the hierarchical addressee list into a flat addressee list 424 comprising no aliases.

The definition of an alias, that is, the list of addressees that it represents, may be available on the email client where a time sensitive email message is created, or an alias may be defined on some other host in an email system. In the method of FIG. 5, therefore, expanding the hierarchical addressee list 420 may include expanding one or more aliases that are defined on one or more email hosts other than an email client where the email message is created. Aliases defined on the email client where the time sensitive email is created are simply expanded locally. For aliases defined on other hosts in the email system, email protocols typically support protocol message types for expanding such aliases. In SMTP, for example, the 'EXPN' command takes as a string parameter an alias identifying a sublist of email addresses and returns the email addresses in the sublist.

Figure 6:
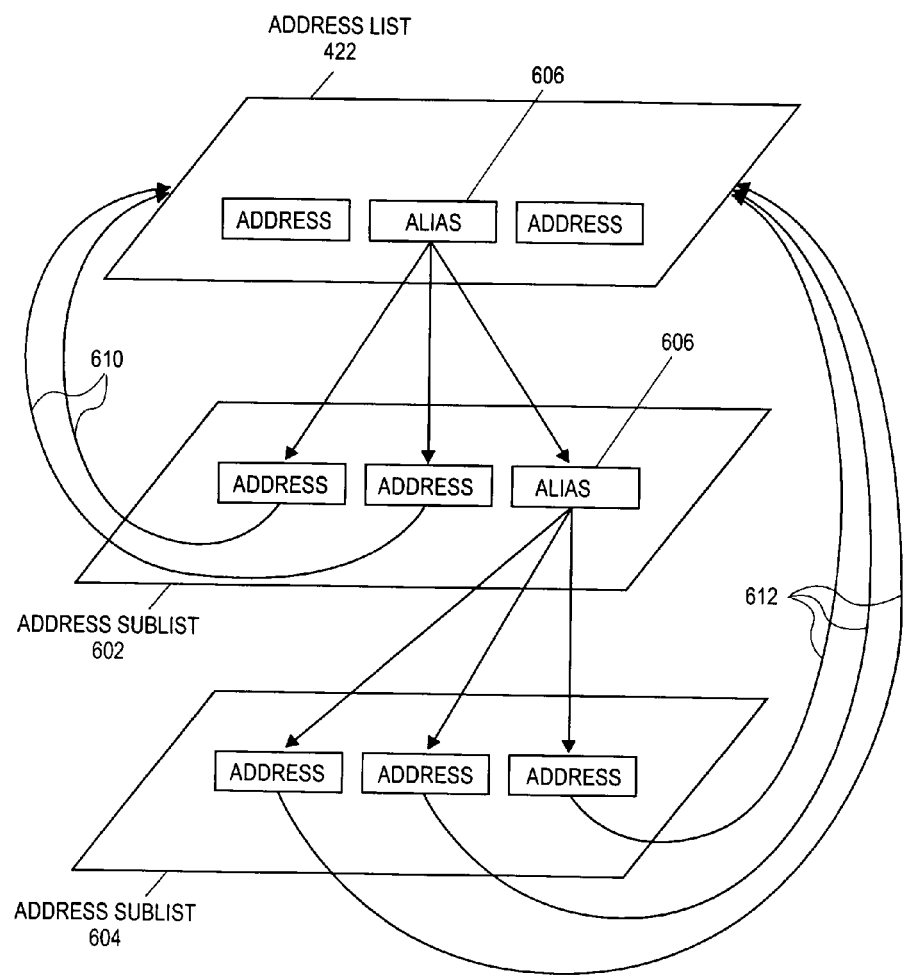
FIG. 6 sets forth a data structure diagram illustrating a tree structure formed by aliases in an addressee list.

For further explanation, consider the data relations illustrated in FIG. 6. FIG. 6 sets forth a data structure diagram illustrating a tree structure formed by aliases in an addressee list. In the example of FIG. 6, addressee list 422 contains three address elements, two email addresses and one alias 606. Alias 606 is defined in sublist 602 as containing three address elements, two email addresses and a further alias 608. The email addresses in sublist 602 may be considered leaf nodes with alias 608 as a further branch node. Alias 608 in turn is defined as sublist 604 in which all address elements a email addresses. The email addresses in sublist 604 may be consider leaf nodes, with no further branches. In this example, alias 606 is expanded into address list 422 by moving 610 the email addresses from sublist 608 to address list 422 and deleting alias 606 from address list 422. Alias 608 is expanded by moving 612 the email addresses from sublist 604 to address list 422. This exemplary procedure converts a hierarchical address list into a flat address list, that is, a list bearing only leaf nodes, no branches.

The method of FIG. 5 also includes verifying 426 all the email addresses in the addressee list. Verifying email addresses is a process of determining whether email addresses for addressees of a time sensitive email message actually exist as valid email addresses somewhere in the email system available to the email client upon which the time sensitive email is created, that is, the 'sender' of a time sensitive email message. Email protocols typically support protocol message types for validating email addresses. In SMTP, for example, the 'VRFY' command takes as a string parameter an email address and returns an indication whether the email address is valid. Alternatively, an email client according to embodiments of the present invention may be programmed to send short test messages to each email address on the addressee list of a time sensitive email to verify the existence and usefulness of the email addresses for the addressees of the time sensitive email message.

The method of FIG. 5 typically also includes determining 504 whether a time sensitive email message 410 can be delivered in accordance with the time constraints 414. The method of claim 5 includes determining 504 whether time constraints can be met. If time constraints cannot be met 514, the method of FIG. 5 includes advising 506 the user who created the email message that the message cannot be delivered in accordance with the time constraints. The exemplary method of FIG. 5 includes advising the user through a computer display 502 and then ceasing operations regarding the time sensitive email. This is an example of operation of an email client according to embodiments of the present invention that either does not support 'Partial-Delivery-Acceptable' when delivery constraints cannot be met or for which the user already selected 'All or Nothing' as the action when delivery constraints cannot be met. In the method of FIG. 5, if the time constraint can be met 516, processing continues as described above with phase-1 delivery 406 for temporary storage outside mailboxes and a phase-2 message instructing 408 destination servers to place the message in addressees' mailboxes.

Time constraints typically are, first, that the message can be staged on all destination servers in temporary storage within a first time limit, a time limit considered in this disclosure a 'phase-1' time limit, or a 'Time-Constraint-Earliest' time limit. In addition, the constraints typically also include a second time limit, a timeout limit for delivery of a 'phase-2' message advising destination servers to place a time sensitive message in its addressees' mailboxes. Email clients according to embodiments of the present invention therefore often are programmed to determine whether a message can be delivered to destination servers within a phase-1 time limit and whether a phase-2 message can be delivered to destination servers then in the period of time between the phase-1 time limit and the phase-2 time limit. A time sensitive email message with large attachments may take many minutes to deliver to all destination servers, while a short phase-2 message may take less one second to deliver to all destination servers.

It is useful for email clients according to embodiments of the present invention to have available measures ("metric") of message delivery timing for use in determining 504 whether a time sensitive email message 410 can be delivered in accordance with time constraints 414 by use of message delivery metric. The method of FIG. 5 therefore also includes providing 508 message delivery metrics 512 for use in determining whether time constraints can be met. In the method of FIG. 5, determining 504 whether the message 410 can be delivered in accordance with the time constraints 414 includes determining, in dependence upon message delivery metrics 512 whether the message 410 can be delivered in accordance with the time constraints 414.

Message delivery metrics may include, for example, hop counts and calculations of delivery times for the size of a message including its attachments. Hop counts can be identified with test messages. Approximate transmission time is identified, for example, with test messages or with calculations of transmission time based upon transmission speed and the size of a message and its attachments. Metrics can include hop count to a most distant email server, a measure that is useful as an indication of an outer boundary of time constraint.

Test messages can be implemented as time sensitive email messages. Servers according to embodiments of the present invention are programmed so that upon receipt of any time sensitive email message (the server need not know that it is a test message), whether the server is a relaying server or a destination server, to return to the sender an email protocol message including a hop count or data from which a hop count can be inferred. A test message may be implemented as a time sensitive email message with an empty body with its Delivery Preference set to 'Discard,' so that when the sender never sends a phase-2 message for it, the test message is discarded upon timeout. A hop count as such can be encoded in meta-data in a time sensitive email (test) message as <hop count N>, for example, where is N is an integer that is incremented every time any server along a delivery route receives a time sensitive email message. Data from which a hop count can be inferred is, for example, a time stamp identifying the time when each server on a delivery route received a time sensitive email message. Inferring the hop count then would be a process of counting the number of such time stamps in a return message. Returning to the sender an email protocol message that includes a hop count or data from which a hop count can be inferred then can be carried out by use of a separate message type or by simply returning a copy of the time sensitive email message itself, bearing the hop count or time stamps, back to the sender, one copy from each server on the delivery route for the time sensitive email (test) message.

The method of FIG. 5 also includes providing 510, for review by users, message delivery information that describes the delivery of the message. Message delivery information typically includes message delivery statistics and message delivery route-related information.

After a user creates a time sensitive email message, the sender may instruct the email client to 'send' the message by, for example, invoking a 'send' menu item like the one illustrated at reference 330 on FIG. 3. In response to such a 'send' instruction, the email client typically is programmed according to embodiments of the present invention to expand aliases in the addressee list, verify the email addresses in the addressee list, determine whether time constraints can be met, send the time sensitive email message to destination servers for phase-1 staging, send the phase-2 message so that it can arrive at destination servers before timeout, and so on. Depending on the relationship between the time when 'send' is invoked and the time constraints, minutes, hours, even days may elapse before the email message is transmitted for phase-1, and more time typically will elapse before the phase-2 message is sent.

The period of time after the time sensitive email message is transmitted for phase-1 staging on destination servers and before the phase-2 message is sent is particularly interesting. Consider an example of a time sensitive email message bearing an important corporate announcement for hundreds or thousands of addressees worldwide. Such a message will travel along many routes having many hop counts with many delivery times across many destination servers and many mailboxes. Email clients according to embodiments of the present invention often therefore advantageously gather and provide for viewing by users message delivery statistics describing the progress of the message as it is delivered to many destination servers.

Providing message delivery information typically includes receiving such information in email protocol messages from email servers disposed along delivery routes for the email message. As mentioned above, servers according to embodiments of the present invention are programmed so that upon receipt of any time sensitive email message, whether the server is a relaying server or a destination server, to return to a sender an email protocol message including a hop count or time stamps from which hop counts can be inferred. Email clients administering time sensitive email messages ('senders') according to embodiments of the present invention are programmed to calculate message delivery statistics such as delivery times and hop counts from the data in such returning email protocol messages. Such message delivery information may be provided to user in detail form, such as, for example:

| | Message Delivery Detail | | | |
|---|---|---|---|---|
| Addressee | Receive Time | Hop Count | Elapsed Time | Phase-1 Staged |
| — | — | — | — | — |
| — | — | — | — | — |
| — | — | — | — | — |

This example of a detailed form of message delivery information includes fields or columns labeled 'Addressee,' 'Receive Time,' 'Hop Count,' 'Elapsed Time,' and 'Phase-1 Staged.' 'Addressee' identifies an addressee from the addressee list of a time sensitive email. 'Receive Time' identifies the last time at which the email message was received in any server on the delivery route to the destination server having the addressee's mailbox. 'Hop Count' sets forth the current hop count at the last server where the message was received anywhere on the delivery route for the message. 'Elapsed Time' sets forth the total time from when the time sensitive email message was first transmitted from its sender email client until the last time at which the email message was received in any server on the delivery route to the destination server having the addressee's mailbox. 'Phase-1 Staged' is a Boolean indication whether the email message has been received and placed in temporary storage in the destination server for the 'Addressee' identified in the left-most column of the display. If 'Phase-1 Staged' is set to FALSE or NO, then 'Receive Time,' 'Hop Count,' and 'Elapsed Time,' for the message as sent to that 'Addressee' are displaying information from an interim or relay server on the delivery route. If 'Phase-1 Staged' is set to TRUE or YES, then 'Receive Time,' 'Hop Count,' and 'Elapsed Time,' for the message as sent to that 'Addressee' are displaying final data derived from a return message from the destination server for the 'Addressee' identified in the left-most column. If 'Phase-1 Staged' is set to TRUE or YES, then the displayed message delivery information may also be derived from one or more interim return messages from relay servers also, but whether relay servers were in the delivery route or not, the message delivery information now reflects final data after receipt of the message at the destination server that has the mailbox for the addressee identified in the left-most column.

Such an table of detail of message delivery information may be calculated in response to receipt of return messages from servers on delivery routes for a particular email protocol message. This example sets forth no message identification, although it could. In this case, however, the user invoked the display of message delivery information from within an edit screen for the particular time sensitive email message in question, such as the one shown in FIG. 3, and therefore knows which time sensitive email message is described. The user may invoke such a display by selecting a pull-down menu item such as the one labeled 'Delivery Details' at reference 328 on FIG. 3. Additionally, in response to selection of a pull-down menu item such as the one labeled 'Delivery Summary' at reference 326 on FIG. 3, the email client may be programmed to display a summary of message delivery information such as, for example:

| Message Delivery Summary |
|---|
| Message is phase-1 staged on destination servers for 45 of 50 addressees. |
| Maximum hop count for any delivery: 5 |
| Maximum elapsed time for any delivery: 23 seconds |

This example of a summary form of message delivery information includes a proportional progress report that in the time since the email message was first transmitted from the sender email client it has been received for temporary storage outside mailboxes on destination servers for 45 out of its 50 addressees. Such a summary statistic may be derived, for example, by counting the 'TRUE' indications in a 'Phase-1 Staged' column in the kind of detailed message delivery information described above. Similarly, maximum hop count and maximum elapsed time for a summary display can be derived by comparison from detailed message delivery information such as that described above for the columns labeled 'Hop Count' and 'Elapsed Time.'

Figure 7:
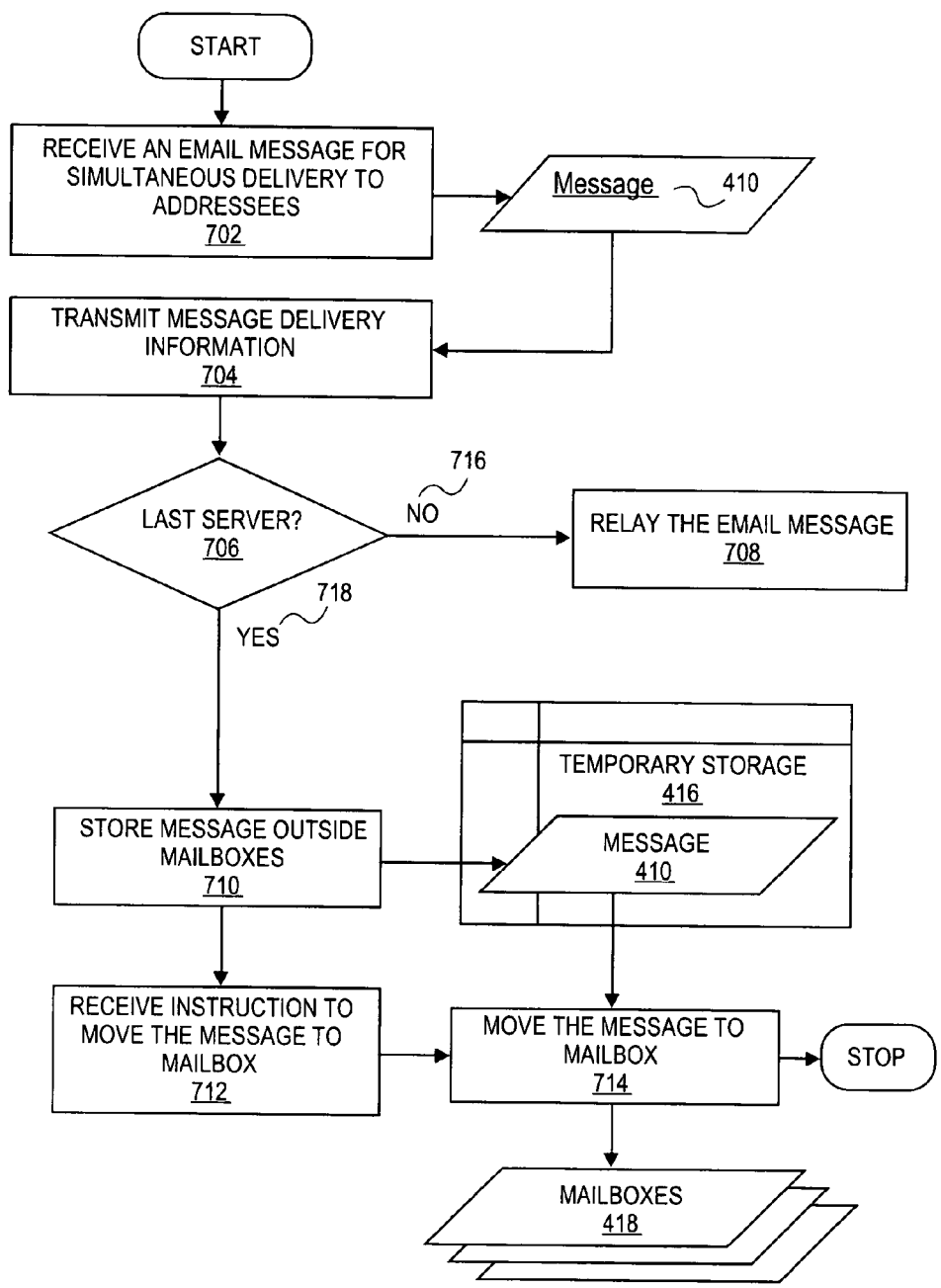
FIG. 7 sets forth a flow chart illustrating a method for delivering time sensitive email that includes receiving in an email server an email message for time-sensitive delivery to a multiplicity of addressees.

FIG. 7 sets forth a flow chart illustrating a method for delivering time sensitive email that includes receiving 702 in an email server an email message 410 for time-sensitive delivery to a multiplicity of addressees. In the method of FIG. 7, the email server is disposed within a delivery route for the email message, and the email message has a sender, a email client where the email message was created and from which it was originally transmitted.

The method of FIG. 7 also includes transmitting 704 to the sender of the email message an email protocol message bearing message delivery information. This email protocol message is of the kind referred to often in this disclosure as a 'return' message. Message delivery information may also include hop count or information from which hop count can be inferred, such as a time stamp identifying the date and time when the message is received in the server.

The method of FIG. 7 includes determining whether the server is the last server on the delivery route 706, and relaying 708 the email message to a next server on the delivery route if the email server is not the last email server in the delivery route 716. The email server sending the return message may be a destination server for the message, that is, the last email server in the delivery route, a server bearing an addressee's mailbox; the server may be an interim server on the delivery route that will forward the message along the delivery route; or the server may both an interim server for some addressees and a destination server for others. That is, any server receiving the email message can determine whether it is a destination server for the message by examining the messages address list and comparing it with the server's internal list of mailboxes on the server. To the extent that the message is addressed to addressees having mailboxes on the server, the server is a destination server for the message. To the extent that the message is addressed to addressees that do not have mailboxes on the server, the server is an 'interim' server or 'relay' server for the message.

If the email server comprises the last server on the delivery route 718, which is to say that the email server further comprises at least one addressee's mailbox 418, the method of FIG. 7 then includes storing 710 the message temporarily outside the addressee's mailbox 416. This is temporary storage in the sense that some addition action eventually occurs that results in the server's removing the message from the temporary storage. Such additional action can be receipt of a phase-2 message, a timeout, or receipt of an instruction to cancel or discard the message.

The method of FIG. 7, for example, includes receiving 712 from the sender an instruction to move the message to the addressee's mailbox. That is, this example includes receiving a phase-2 message, and responsive to the instruction, the phase-2 message, moving 714 the time sensitive email message to at least one addressee's mailbox.

Figure 8:
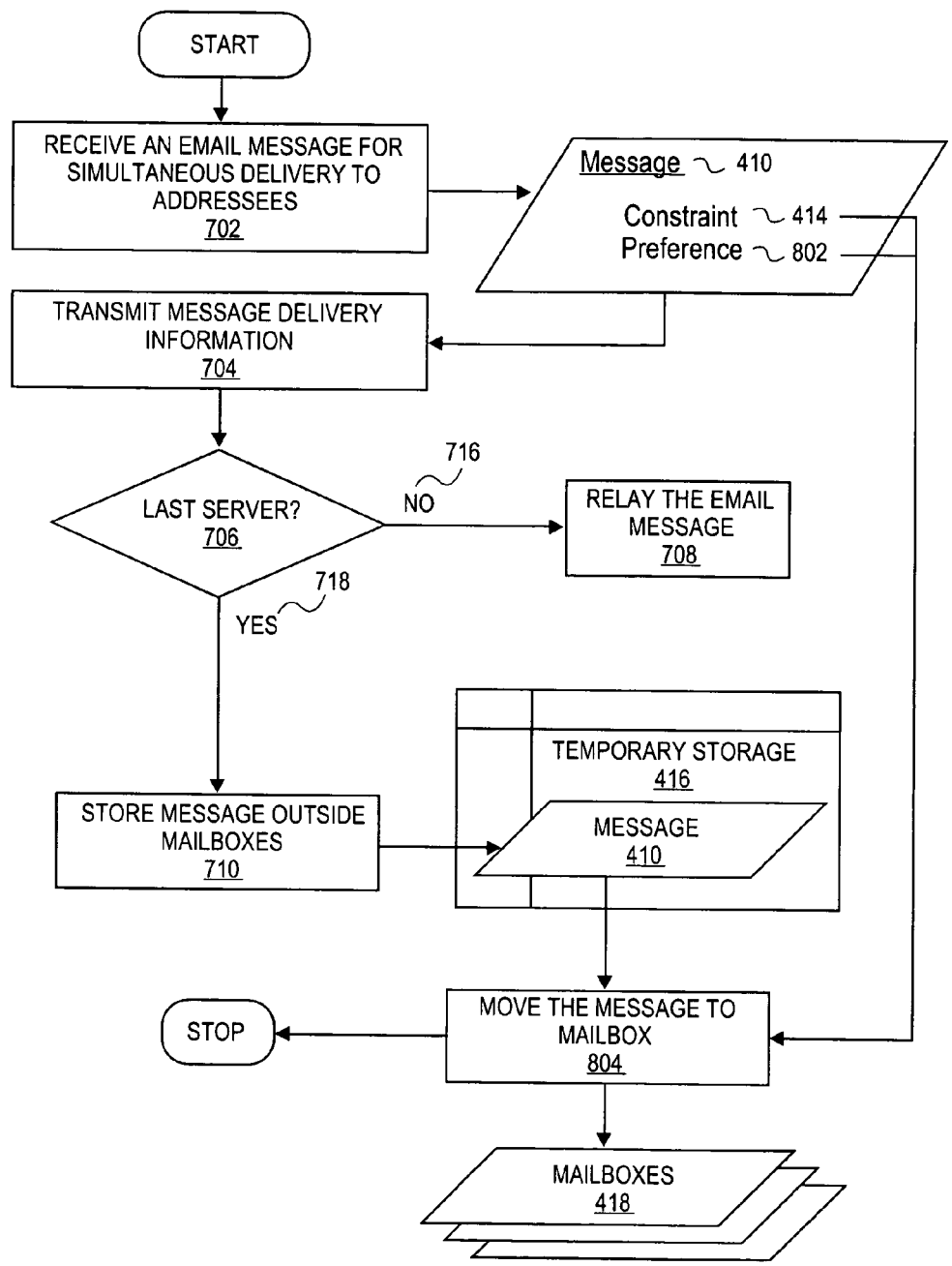
FIG. 8 sets forth a flow chart illustrating removal of a message from temporary storage upon timeout.

FIG. 8 sets forth a flow chart illustrating an example in which another action occurs to trigger removal of a message from temporary storage, in this example, a timeout. In the method of FIG. 8, the email server comprises the last server on the delivery route, which means that the email server further comprises an addressee's mailbox 418. In this example, the message 410 comprises at least one timing constraint 414 and at least one user preference 802 regarding delivery. The method of FIG. 8 then includes storing 710 the message temporarily outside the addressee's mailbox 416, and moving 804 the message to the addressee's mailbox in dependence upon the timing constraint 414 and the user preference 802.

Consider an example where the timing constraint is a time limit for receipt of a phase-2 message, and no phase-2 message is received before the time limit expires—an example of a 'timeout.' Such a message can have header data like the following:

From: John Doe <jdoe@machine.example>
To: Mary Smith <mary@example.net>
Subject: Important Corporate Announcement
Date: Fri, 21 Nov. 2003 09:55:06
Message-ID: <1234@local.machine.example>
Message-Type: Time Sensitive
Time-Constraint-Earliest: Sat, 15 Dec. 2003 08:00:00
Time-Constraint-Latest: Sat, 15 Dec. 2003 09:00:00
Delivery-Preference: Discard In this example, the server having this message in temporary storage notes a timeout, that is, that the current clock time on the server is later than Sat, 15 Dec 2003 09:00:00. The server checks the 'Delivery-Preference' field and notes that it is set to 'Discard.' In this example, moving 804 the message to the addressee's mailbox in dependence upon the timing constraint 414 and the user preference 802 means not moving the message, discarding it instead. If the delivery preference were set to 'Deliver-Anyway,' then moving 804 the message to the addressee's mailbox in dependence upon the timing constraint 414 and the user preference 802 means moving the message to the addressee's mailbox upon timeout.

Figure 9:
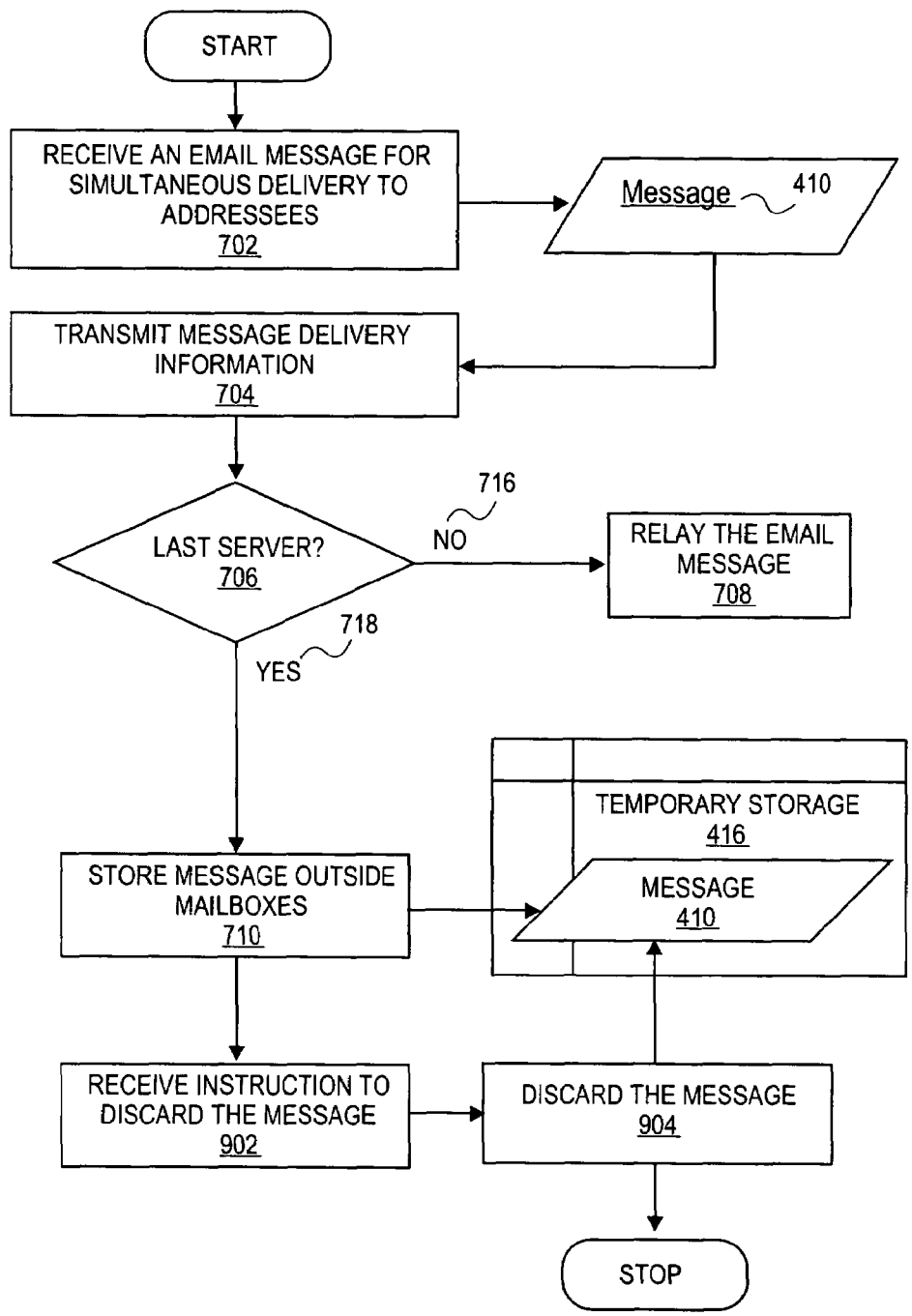
FIG. 9 sets forth a flow chart illustrating removal of a message from temporary storage upon receiving a discard message.

FIG. 9 sets forth a flow chart illustrating an example in which a still further action occurs to trigger removal of a message from temporary storage, in this example, a discard message. In the method of FIG. 9, the email server is again the last server on the delivery route for the time sensitive email message, and the method includes storing 710 the message temporarily outside the addressee's mailbox 416. The method of FIG. 9 also includes receiving 902 from the sender an instruction to discard the message and, responsive to the instruction, discarding the message 904. An instruction from a sender to discard a time sensitive email message may be implemented as an email protocol message generated by the email client that originated the email message, generated in response to a user's invoking a pull-down menu item such as the one labeled 'Cancel' at reference 332 on FIG. 3.

A user may decide to cancel or discard such a time sensitive email message for many reasons, and, because of there is some amount of time that elapses after the user invokes 'send' and before the email client transmit a phase-2 message, the user may have sufficient time to change plans and order a cancellation of the email message. In addition, the user may observe summary message delivery information or detailed message delivery information, as described above, and decide to cancel the email message upon observing from displayed message delivery information that the message in fact is not being delivered with the quality of service desired.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for delivering time sensitive email, the system comprising a computer processor, a computer memory operatively coupled to the computer processor, the computer memory having disposed within it computer program instructions capable of:
   creating an email message for simultaneous delivery to a multiplicity of addressees' mailboxes on email servers, including inserting in the email message a data element identifying the message as a message for simultaneous delivery;
   assigning delivery time constraints to the message;
   delivering the message, in accordance with the time constraints and for temporary storage outside the mailboxes, to email servers having addressees' mailboxes;
   instructing the servers to place the message in all addressees' mailboxes at approximately a same time; and
   determining whether the message can be delivered in accordance with the time constraints, further comprising providing message delivery metrics, wherein determining whether the message can be delivered in accordance with the time constraints further comprises determining, in dependence upon the message delivery metrics, whether the message can be delivered in accordance with the time constraints.

2. The system of claim 1 wherein creating an email message includes indicating an action to be taken when the time constraints cannot be met.

3. The system of claim 1 wherein creating an email message includes indicating an action to be taken when one or more servers, having stored the message outside mailboxes, fail to receive an instruction to place the message in mailboxes.

4. The system of claim 1 wherein the email message comprises a hierarchical addressee list comprising aliases and the system further comprises expanding the hierarchical addressee list into a flat addressee list comprising no aliases.

5. The system of claim 1 wherein expanding the hierarchical addressee list comprises expanding one or more aliases that are defined on one or more email hosts other than an email client where the email message is created.

6. The system of claim 1 wherein the email message comprises an addressee list comprising email addresses and the system further comprises computer program instructions capable of verifying all the email addresses in the addressee list.

7. The system of claim 1 further comprising:
   determining that the message cannot be delivered in accordance with the time constraints; and
   advising a user who created the email message that the message cannot be delivered in accordance with the time constraints.

8. The system of claim 1 further comprising providing, for review by users, message delivery information that describes the delivery of the message.

9. A computer program product for delivering time sensitive email, the computer program product comprising:
   a recording medium;
   means, recorded on the recording medium, for creating an email message for simultaneous delivery to a multiplicity of addressees' mailboxes on email servers, including inserting in the email message a data element identifying the message as a message for simultaneous delivery;
   means, recorded on the recording medium, for assigning delivery time constraints to the message;
   means, recorded on the recording medium, for delivering the message, in accordance with the time constraints and for temporary storage outside the mailboxes, to email servers having addressees' mailboxes;
   means, recorded on the recording medium, for instructing the servers to place the message in all addressees' mailboxes at approximately a same time; and
   means, recorded on the recording medium, for determining whether the message can be delivered in accordance with the time constraints, further comprising means, recorded on the recording medium, for providing message delivery metrics, wherein means for determining whether the message can be delivered in accordance with the time constraints further comprises means, recorded on the recording medium, for determining, in dependence upon the message delivery metrics, whether the message can be delivered in accordance with the time constraints.

10. The computer program product of claim 9 wherein means for creating an email message includes means, recorded on the recording medium, for indicating an action to be taken when the time constraints cannot be met.

11. The computer program product of claim 9 wherein means for creating an email message includes means, recorded on the recording medium, for indicating an action to be taken when one or more servers, having stored the message outside mailboxes, fail to receive an instruction to place the message in mailboxes.

12. The computer program product of claim 9 wherein the email message comprises a hierarchical addressee list comprising aliases and the computer program product further comprises means, recorded on the recording medium, for expanding the hierarchical addressee list into a flat addressee list comprising no aliases.

13. The computer program product of claim 9 wherein means for expanding the hierarchical addressee list comprises means, recorded on the recording medium, for expanding one or more aliases that are defined on one or more email hosts other than an email client where the email message is created.

14. The computer program product of claim 9 wherein the email message comprises an addressee list comprising email addresses and the computer program product further comprises means, recorded on the recording medium, for verifying all the email addresses in the addressee list.

15. The computer program product of claim 9 further comprising:
    means, recorded on the recording medium, for determining that the message cannot be delivered in accordance with the time constraints; and
    means, recorded on the recording medium, for advising a user who created the email message that the message cannot be delivered in accordance with the time constraints.

16. The computer program product of claim 9 further comprising means, recorded on the recording medium, for providing, for review by users, message delivery information that describes the delivery of the message.

* * * * *